March 21, 1944.  I. WEISBERGER  2,344,757
BICYCLE
Filed Sept. 29, 1942
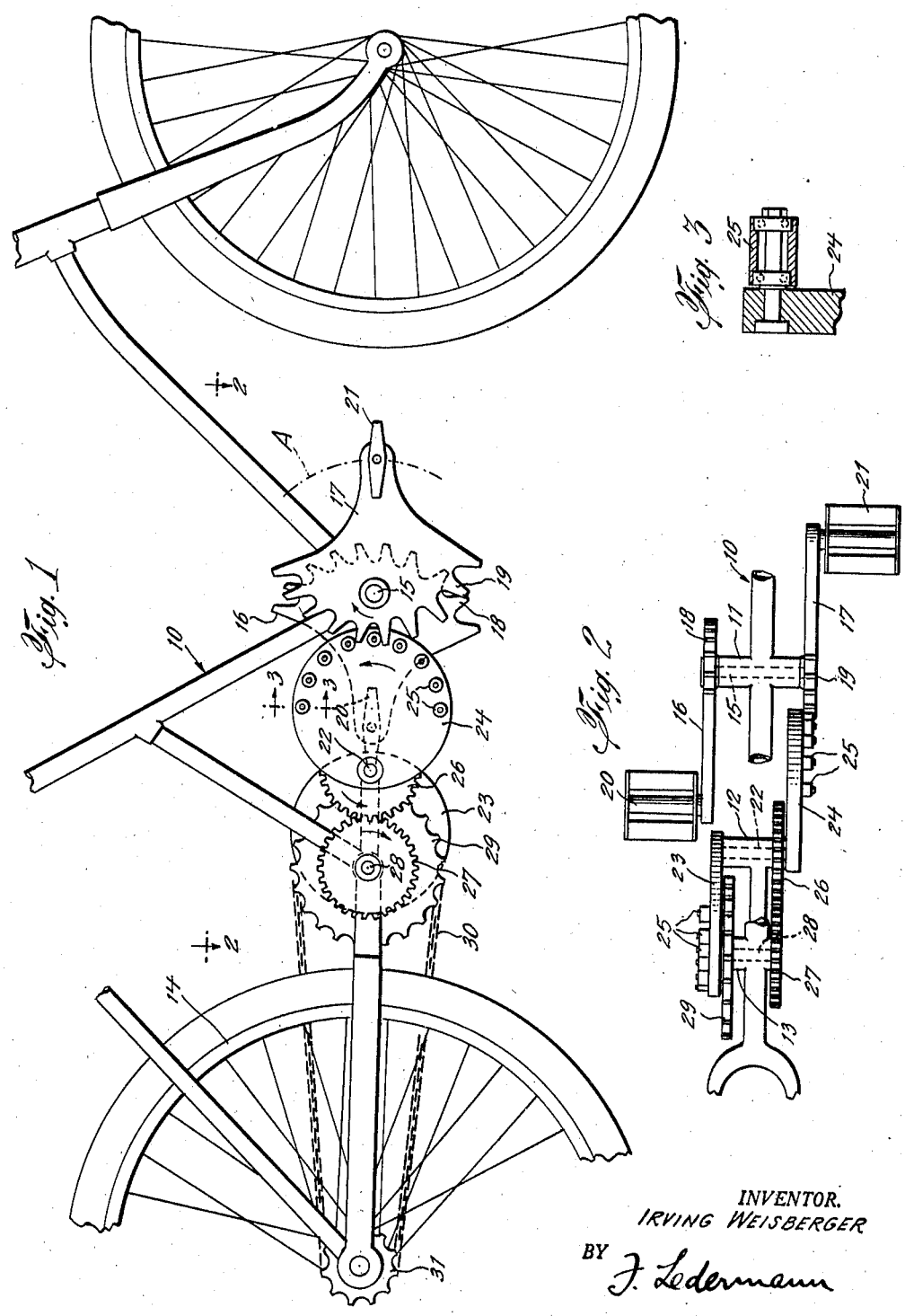
INVENTOR.
IRVING WEISBERGER
BY J. Ledermann Patented Mar. 21, 1944

2,344,757

UNITED STATES PATENT OFFICE 2,344,757

BICYCLE

Irving Weisberger, New York, N. Y.

Application September 29, 1942, Serial No. 460,098

1 Claim. (Cl. 74—437)

This invention relates to bicycles, and more particularly to propelling means for the same, and aims to provide certain new and useful improvements whereby the tractive or propelling force delivered by the rear or driving wheel is increased.

Another object of the invention is the provision of such propelling means whereby the tractive force delivered to the drive wheel is increased without any increase in effort upon the part of the rider.

The above and other objects will become apparent in the description below, reference being had to the accompanying drawing which forms a part hereof. The drawing is presented to serve the purpose of illustration only, and it is neither intended nor desired to limit the invention either to the specific details shown or in any other manner excepting within the scope of the appended claim.

Referring briefly to the drawing, Fig. 1 is a fragmentary side elevational view of a bicycle equipped with the instant invention.

Fig. 2 is a cross-sectional view taken on the line 2—2 of Fig. 1.

Fig. 3 is a cross-sectional view taken on the line 3—3 of Fig. 1.

Referring in detail to the drawing, the numeral 10 indicates the bicycle frame which includes bearing supports or housings 11, 12, and 13 all lying in the same horizontal plane. The rear or drive wheel is shown at 14.

The pedal shaft 15 is mounted in the housing 11 and has rigid on the extremities thereof a pair of oppositely extending radial sectors or sector gears, or, as they might also be termed, toothed sectors, 16 and 17. The point of securement of each of these sectors to the shaft 15 is situated relatively close to the circular edge of the sector, or, in other words, in a position which is extremely eccentric with respect to the center of the circular edge. The circular edges of the sectors are provided with gear teeth or the like 18 and 19, respectively; at their reduced or opposite ends the sectors are provided with the usual pedals 20 and 21, respectively.

A shaft 22 is supported in the frame housing 12 and eccentrically secured to each end thereof are discs 23 and 24. These discs also extend diametrically opposite to each other, and their points of attachment to the ends of the shaft 22 are also close to their peripheries. It is to be noted that the distance between shafts 22 and 15 is equal to the distance between each pedal pivot and its arcuate toothed periphery on a line through the shaft 15. Arranged adjacent and concentric with about one-half of the periphery of each disc, along the opposed peripheral edges, are spaced rollers 25. The arcuate length of the toothed portion of each sector is slightly greater than that of one-half the periphery of the disc adjacent thereto, and there is one more tooth in each sector than the number of rollers on the disc. A gear 26 is also rigid on the shaft 22 and is in mesh with a gear 27 rigid on the shaft 28 in the housing 13. On the other end of the shaft 28 there is a sprocket wheel 29; a chain 30 is trained over the sprocket wheel 29 and a sprocket pinion 31 of the rear wheel 14.

When the mechanism is as shown in Fig. 1 and the forward or right-hand pedal 21 is depressed, the toothed edge thereof will rise and, by its engagement with the rollers 25 of the disc 24, will rotate the latter in a counterclockwise direction and thus, as shown by the arrows on the gears 26 and 27, as well as by those on the sector 17 and disc 24, propel the vehicle forward. During this movement of the sector teeth, the disc 24 will swing upward about its shaft 22 in the direction of the arrow thereon, and conversely the disc 23 will swing downward in the same peripheral direction. The arrangement of the discs and their rollers 25 with their respective sectors and sector teeth, is obviously such that just as the last roller 25 of the disc 24 is leaving the space between the last two teeth 19 of the sector 17, the first roller 25 of the disc 23 will be entering the space between the first two teeth of the sector 16, thus providing continuous, i. e., uninterrupted driving torque to the shaft 22. It is particularly to be noted that the downwardly traveling pedal 21 is delivering power to propel the vehicle only during the time that the pedal travels through an arc which extends but a short distance above and below the horizontal level of the pedal shown in Fig. 1. In other words, while the pedal is depressed through that small arc, the disc 24 travels through one-half its peripheral orbit and thus brings the other disc 23 into position to be engaged by the first tooth of the other sector 16. The arc through which the pedal is depressed, that is, during which the driver is doing work upon it, is represented in broken lines and indicated by the reference character A in Fig. 1. While the pedal is moving downward along the upper or lower continuation of this arc, the toothed sector is out of engagement with its corresponding roller wheel, so that the rider exerts no propelling force on the pedal. And it is further to be noted that the maximum torque is exerted when the pedal 21 is in the horizontal position shown, so that from the top of the arc A to the bottom represents the distance through which most of the effective torque is applied by the rider's pedalling, whereas in the ordinary bicycle he continues to exert the torque throughout as much of the half-circle in which his foot travels downward as he is physically able; since the torque above and below the arc A is small even with great force exerted upon the pedal, it is apparent that the rider works much harder for small results. The advantage, therefore, of the instant invention in propelling a bicycle up an incline or hill, is apparent. The pedal torque is applied only through that portion of the orbit of the pedal in which it is most effective, thus requiring a minimum of work on the part of the rider.

Obviously, modifications in form and structure may be made without departing from the spirit and scope of the invention.

I claim:

In a bicycle having a drive shaft, oppositely extending discs secured eccentrically to the ends of said shaft, said discs having rollers arranged in spaced apart relation around that edge thereof opposite the axis of eccentric securement, a pedal shaft positioned forward of said drive shaft and having toothed sectors secured eccentrically to the ends thereof with the toothed edges thereof being adjacent said axis and facing in opposite directions, the free ends of said sectors opposite said toothed edges having pedals thereon, the teeth on one of said sectors meshing with said rollers on one of said discs during downward movement of the pedal thereof and the teeth on the other of said sectors being clear of said rollers on said other disc during the said downward movement of the said pedal, and vice versa.

IRVING WEISBERGER.